(12) United States Patent
Hirata et al.

(10) Patent No.: US 10,050,576 B2
(45) Date of Patent: Aug. 14, 2018

(54) INVERTER CONTROL DEVICE AND AIR CONDITIONER

(71) Applicant: Mitsubishi Electric Corporation, Tokyo (JP)

(72) Inventors: Takahiro Hirata, Tokyo (JP); Makoto Tanikawa, Tokyo (JP); Tomomi Higashikawa, Tokyo (JP); Akiyoshi Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/531,227

(22) PCT Filed: Feb. 19, 2015

(86) PCT No.: PCT/JP2015/054618
§ 371 (c)(1),
(2) Date: May 26, 2017

(87) PCT Pub. No.: WO2016/132509
PCT Pub. Date: Aug. 25, 2016

(65) Prior Publication Data
US 2017/0331407 A1 Nov. 16, 2017

(51) Int. Cl.
*H02P 27/06* (2006.01)
*H02P 29/66* (2016.01)
*F25B 49/02* (2006.01)

(52) U.S. Cl.
CPC ............ *H02P 27/06* (2013.01); *F25B 49/025* (2013.01); *H02P 29/662* (2016.11);
(Continued)

(58) Field of Classification Search
CPC ....... H02P 27/06; H02P 29/662; F25B 49/025
(Continued)

(56) References Cited

U.S. PATENT DOCUMENTS

| 5,196,775 A | 3/1993 | Harris et al. |
| 8,884,571 B2 * | 11/2014 | Okita ................ G05B 9/02 |
| | | 318/566 |
| 2012/0217915 A1 | 8/2012 | Wu et al. |

FOREIGN PATENT DOCUMENTS

| EP | 2 273 662 A1 | 1/2011 |
| EP | 2 637 297 A2 | 9/2013 |

(Continued)

OTHER PUBLICATIONS

Machine translation JP2010233304A.*
(Continued)

*Primary Examiner* — Kawing Chan
(74) *Attorney, Agent, or Firm* — Posz Law Group, PLC

(57) ABSTRACT

An inverter control device that controls an inverter unit that converts a DC voltage from a converter unit to an AC voltage and supplies the AC voltage to the DC motor includes a storage unit that stores therein information regarding a synchronization-loss limit; a synchronization-loss limit-current calculation unit that calculates the limitation value on the synchronization-loss limit current on the basis of the magnet temperature of the DC motor, the bus voltage to be applied to the inverter unit, and the information regarding a synchronization-loss limit; and a control unit that compares the primary current to be input to the converter unit with the limitation value and that, when the primary current exceeds the limitation value, outputs an adjustment command to adjust the operating frequency of the DC motor such that the primary current becomes equal to or less than the limitation value.

15 Claims, 9 Drawing Sheets

(52) U.S. Cl.
CPC ..... *F25B 2600/021* (2013.01); *F25B 2700/15* (2013.01); *F25B 2700/21156* (2013.01)

(58) Field of Classification Search
USPC .................................................... 318/400.08
See application file for complete search history.

(56) References Cited

FOREIGN PATENT DOCUMENTS

| JP | 09-312988 | A | 12/1997 |
|---|---|---|---|
| JP | H10-084696 | A | 3/1998 |
| JP | 11-103592 | A | 4/1999 |
| JP | 2008-172880 | A | 7/2008 |
| JP | 2012-055119 | A | 9/2010 |
| JP | 2010-233304 | A | 10/2010 |
| JP | 5339985 | B2 | 8/2013 |
| JP | 2013-192428 | A | 9/2013 |
| JP | 2014-045654 | A | 3/2014 |
| JP | 2014-068459 | A | 4/2014 |

OTHER PUBLICATIONS

Machine translation JP2014068459A.*
Machine translation JP2014045654A.*
International Search Report of the International Searching Authority dated May 19, 2015 for the corresponding International application No. PCT/JP2015/054618 (and English translation).
Office Action dated Sep. 19, 2017 issued in corresponding JP patent application No. 2017-500221 (and English translation).
Extended European Search Report dated Oct. 27, 2017 issued in corresponding EP patent application No. 5871302.4.
Partial Supplementary European Search Report dated Jun. 28, 2017 issued in corresponding EP patent application No. 15871302.4.
Office Action dated Feb. 21, 2018 issued in corresponding AU patent application No. 2015383429.

\* cited by examiner

INVERTER CONTROL DEVICE AND AIR CONDITIONER

CROSS REFERENCE TO RELATED APPLICATION

This application is a U.S. national stage application of International Patent Application No. PCT/JP2015/054618 filed on Feb. 19, 2015, the disclosure of which is incorporated herein by reference.

TECHNICAL FIELD

The present application relates to an inverter control device for driving a DC motor, where the inverter control device drives a DC motor connected to an inverter, and also relates to an air conditioner.

BACKGROUND

A conventional inverter control device for driving a DC motor of an air conditioner executes control to prevent the DC motor from discontinuing the operation due to a loss of synchronization. More specifically, the inverter control device controls the operation of the DC motor in such a manner that a primary current, input to a converter unit that converts an AC voltage from a commercial AC power supply to a DC voltage, does not exceed the current data that is determined as a synchronization-loss limit value for certain given conditions. With this control, the conventional inverter control device achieves a stable operation of a DC motor.

PATENT LITERATURE

Patent Literature 1: Japanese Patent Application Laid-open No. 2008-172880
Patent Literature 2: Japanese Patent Application Laid-open No. H9-312988

Conventionally, the current data determined as a synchronization-loss limit value is a fixed value and remains unchanged. However, the value of the primary current at which a loss of synchronization may occur varies depending on the operating state of the DC motor. Therefore, with the conventional control, a change in the operating state may cause a loss of synchronization, and the DC motor may thus discontinue operating.

The present invention has been achieved in view of the above, and an object of the present invention is to provide an inverter control device and an air conditioner that can execute a control to prevent a DC motor from discontinuing the operation due to a loss of synchronization in such a manner that the control is executed according to the operating state.

SUMMARY

In order to solve the above problems and achieve the object, an aspect of the present invention is an inverter control device that controls an inverter unit that converts a DC voltage from a converter unit to an AC voltage and supplies the AC voltage to a DC motor, where the converter unit converts a voltage from a commercial AC power supply to a DC voltage, the inverter control device including: a magnet-temperature detection unit that detects a magnet temperature of the DC motor; a bus-voltage detection unit that detects, as a bus voltage, a DC voltage to be applied to the inverter unit; a primary-current detection unit that detects a primary current to be input to the converter unit; and a control unit that controls the inverter unit, wherein the control unit includes a storage unit that stores therein information regarding a synchronization-loss limit, a synchronization-loss limit-current calculation unit that calculates a limitation value on a synchronization-loss limit current on a basis of the magnet temperature, the bus voltage, and the information regarding the synchronization-loss limit, a primary-current limitation control unit that compares the primary current with the limitation value and that, when the primary current exceeds the limitation value, outputs an adjustment command to adjust an operating frequency of the DC motor such that the primary current becomes equal to or less than the limitation value, an operating-frequency control unit that adjusts the operating frequency on a basis of the adjustment command and that outputs a generation command to generate a signal corresponding to the operating frequency, and a waveform generation unit that generates a drive signal corresponding to the generation command and that outputs the drive signal to the inverter unit.

Advantageous Effects of Invention

According to the present invention, it is possible to execute a control to prevent a DC motor from discontinuing the operation due to a loss of synchronization in such a manner that the control is executed according to the operating state.

DETAILED DESCRIPTION

An inverter control device for driving a DC motor and an air conditioner according to embodiments of the present invention will be explained below in detail with reference to the accompanying drawings. The present invention is not limited to the embodiments.

First Embodiment

Figure 1:
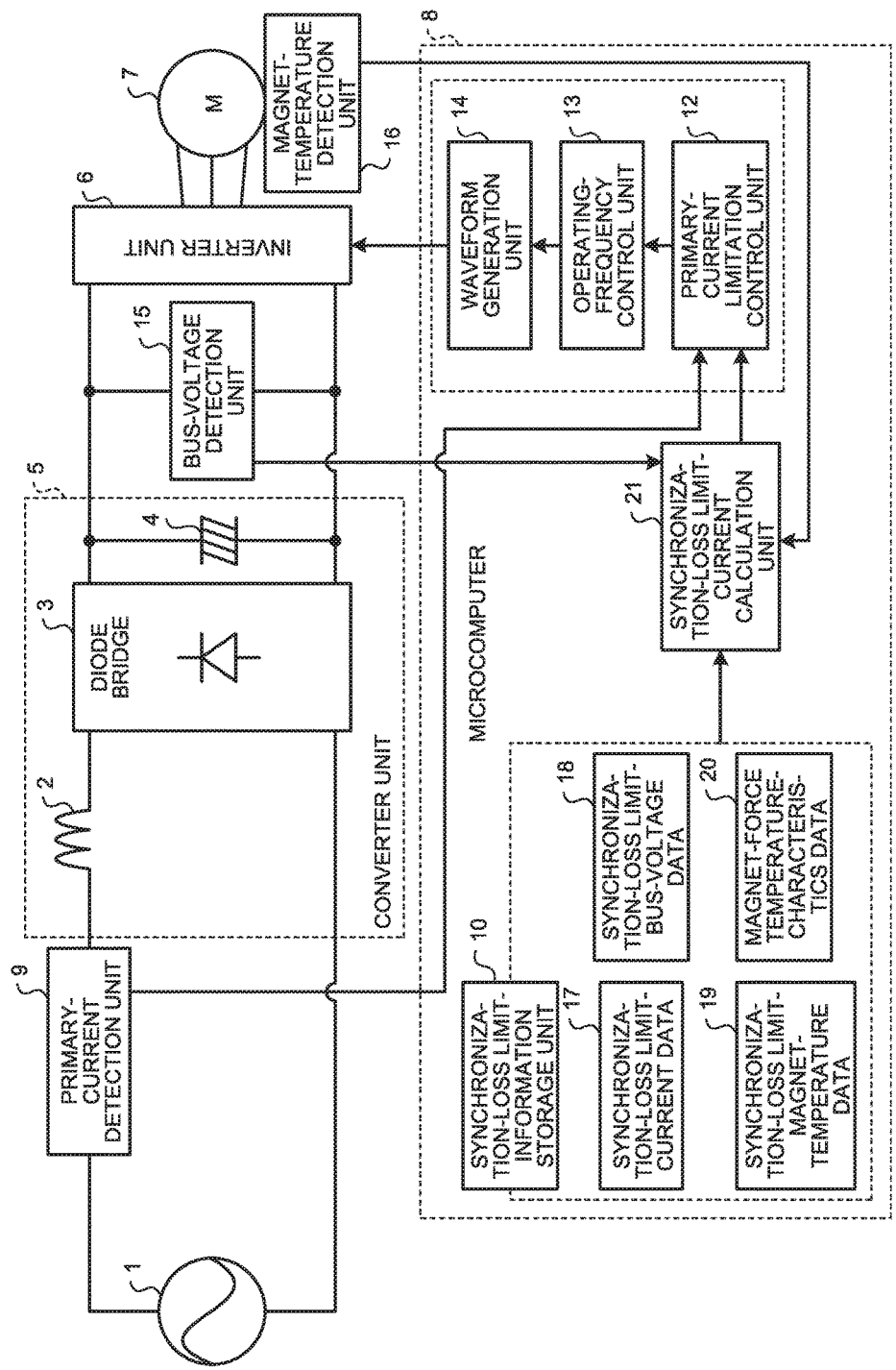
FIG. 1 is a schematic diagram illustrating a configuration of an inverter control device for driving a DC motor according to a first embodiment.

FIG. 1 is a schematic diagram illustrating a configuration of an inverter control device for driving a DC motor according to a first embodiment. As illustrated in FIG. 1, the inverter control device for driving a DC motor includes a converter unit 5 that converts an AC voltage from a commercial AC power supply 1 to a DC voltage; an inverter unit 6 that converts a DC voltage from the converter unit 5 to an AC voltage and supplies the AC voltage to a DC motor 7; a microcomputer 8 that controls the inverter unit 6; a primary-current detection unit 9 that detects the primary current to be input to the converter unit 5; a bus-voltage detection unit 15 that detects the bus voltage to be applied to the inverter unit 6; and a magnet-temperature detection unit 16 that detects the magnet temperature of the DC motor 7. The converter unit 5 includes a reactor 2; a rectifying diode bridge 3; and a smoothing electrolytic capacitor 4. The inverter unit 6 includes switching elements (not illustrated) that are controlled to be turned on/off on the basis of the drive signal from the microcomputer 8, thereby converting the DC voltage generated by the converter unit 5 to a three-phase AC voltage. The DC motor 7 is connected to the inverter unit 6 and, by having the voltage to be supplied from the inverter unit 6 controlled, the DC motor 7 can operate at any operating frequency.

The microcomputer 8 includes a synchronization-loss limit-information storage unit 10 that stores therein synchronization-loss limit information; a synchronization-loss limit-current calculation unit 21 that calculates the limitation value on the synchronization-loss limit current by using the magnet temperature detected by the magnet-temperature detection unit 16, the bus voltage detected by the bus-voltage detection unit 15, and the synchronization-loss limit information stored in the synchronization-loss limit-information storage unit 10; a primary-current limitation control unit 12 that monitors the primary current and issues a command such that the primary current does not exceed the limitation value on the synchronization-loss limit current; an operating-frequency control unit 13 that controls the operating frequency on the basis of the command from the primary-current limitation control unit; and a waveform generation unit 14 that outputs a drive signal according to the output of the operating-frequency control unit. The microcomputer 8 is an example of the control unit.

The primary-current limitation control unit 12 compares the primary current detected by the primary-current detection unit 9 with the limitation value on the synchronization-loss limit current. When the primary current exceeds the limitation value, the primary-current limitation control unit 12 outputs to the operating-frequency control unit 13 an adjustment command to adjust the operating frequency of the DC motor 7 such that the primary current becomes equal to or less than the limitation value. The operating-frequency control unit 13 adjusts the operating frequency of the DC motor 7 on the basis of the adjustment command output from the primary-current limitation control unit 12 and outputs to the waveform generation unit 14 a generation command to generate a signal that corresponds to the adjusted operating frequency. The waveform generation unit 14 generates a drive signal that corresponds to the generation command output from the operating-frequency control unit 13 and outputs the drive signal to the inverter unit 6.

The synchronization-loss limit-information storage unit 10 stores therein, as synchronization-loss limit information, synchronization-loss limit-current data 17 that is the primary current at which the DC motor is out of synchronization, measured under certain given conditions; synchronization-loss limit-bus-voltage data 18 that is the bus voltage at which a synchronization-loss limit is measured; synchronization-loss limit-magnet-temperature data 19 that is the magnet temperature at which a synchronization-loss limit is measured; and magnetic-force temperature-characteristics data 20 that is magnetic-force characteristics attributable to the magnet temperature of the DC motor. The synchronization-loss limit information is used for a process of calculating the limitation value on the synchronization-loss limit current by the microcomputer 8. The synchronization-loss limit-information storage unit 10 is an example of the storage unit. The synchronization-loss limit information is an example of information regarding a synchronization-loss limit.

With the control to prevent the DC motor 7 from discontinuing the operation due to a loss of synchronization, the inverter control device according to the first embodiment additionally includes the bus-voltage detection unit 15 that detects the bus voltage to be applied to the inverter unit 6; and the magnet-temperature detection unit 16 that detects the magnet temperature of the DC motor 7. Further, the inverter control device according to the first embodiment includes the synchronization-loss limit-current calculation unit 21 that calculates the limitation value on the synchronization-loss limit current on the basis of the magnet temperature of the DC motor 7; the bus voltage to be applied to the inverter unit 6; and the synchronization-loss limit information stored in the synchronization-loss limit-information storage unit 10. Furthermore, the inverter control device according to the first embodiment includes the primary-current limitation control unit 12 that compares the limitation value on the synchronization-loss limit current with the primary current detected by the primary-current detection unit 9 and that adjusts the operating frequency of the DC motor such that the primary current becomes equal to or less than the limitation value, when the result of the comparison is that the primary current exceeds the limitation value. The inverter control device according to the first embodiment also includes the operating-frequency control unit 13 and the waveform generation unit 14. With this configuration, the inverter control device according to the first embodiment executes a control to prevent the DC motor from discontinuing the operation due to a loss of synchronization in such a manner that the control is executed according to the operating load.

Figure 2:
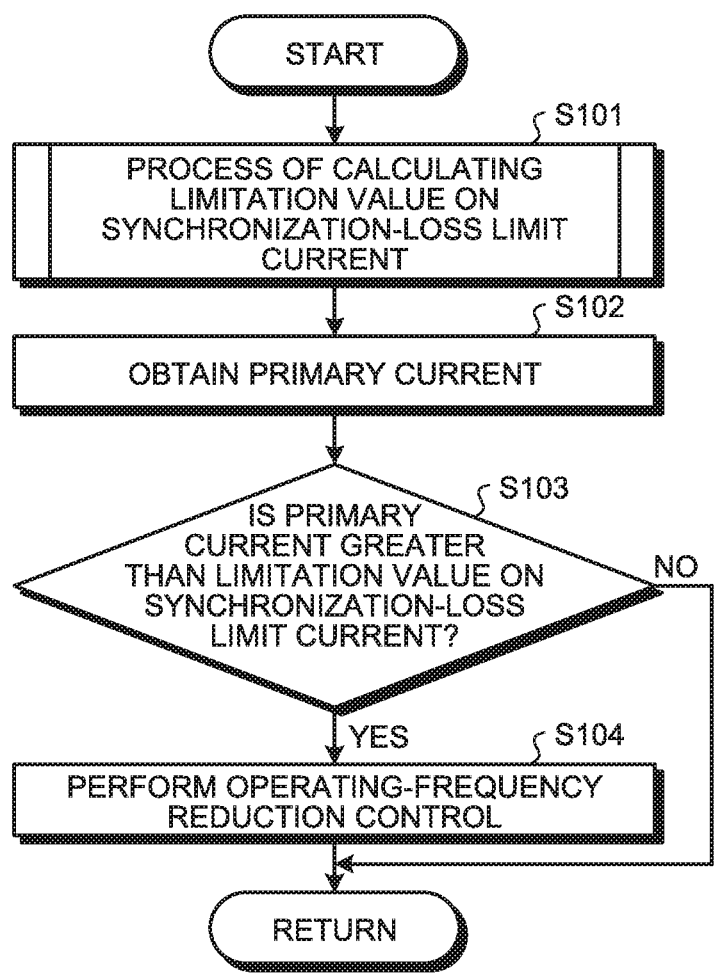
FIG. 2 is a flowchart illustrating a process flow according to the first embodiment.
Figure 3:
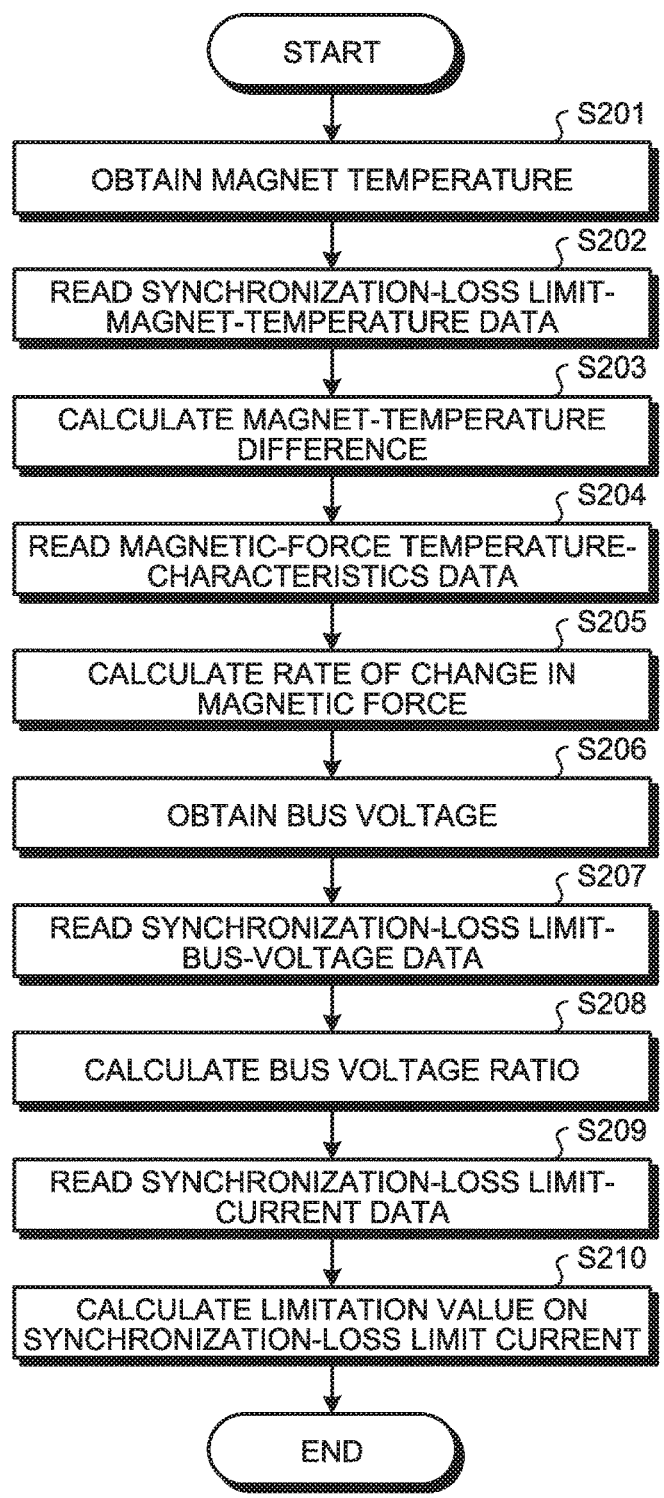
FIG. 3 is a flowchart illustrating a process flow according to the first embodiment.

With reference to FIGS. 2 and 3, an operation of the inverter control device according to the first embodiment is described. FIGS. 2 and 3 are flowcharts illustrating a process flow according to the first embodiment.

First, with reference to FIG. 2, a process flow is described for the synchronization-loss prevention control executed by the inverter control device according to the first embodiment.

As illustrated in FIG. 2, the inverter control device performs a process of calculating the limitation value on the synchronization-loss limit current (Step S101). The process of calculating the limitation value on the synchronization-loss limit current is described later with reference to FIG. 3. Next, the inverter control device obtains a primary current (Step S102). Next, the inverter control device compares the primary current obtained at Step S102 with the limitation value calculated by the process of calculating the limitation value on the synchronization-loss limit current at Step S101, and determines whether the primary current exceeds the limitation value (Step S103).

When the result of the determination at Step S103 is that the primary current exceeds the limitation value (YES at Step S103), the inverter control device executes a control to reduce the operating frequency of the DC motor 7 (Step S104) and then returns to Step S101. In contrast, when the result of the determination at Step S103 is that the primary current does not exceed the limitation value (NO at Step S103), the inverter control device directly returns to Step S101.

Next, with reference to FIG. 3, a process flow is described for calculating the limitation value on the synchronization-loss limit current in the inverter control device according to the first embodiment.

As illustrated in FIG. 3, the inverter control device obtains the magnet temperature of the DC motor 7 (Step S201). Next, the inverter control device reads the synchronization-loss limit-magnet-temperature data 19 from the synchronization-loss limit-information storage unit 10 (Step S202). Next, the inverter control device uses the magnet temperature obtained at Step S201 and the synchronization-loss limit-magnet-temperature data 19 read at Step S202 to calculate the magnet-temperature difference (Step S203).

Next, the inverter control device reads the magnetic-force temperature-characteristics data 20 from the synchronization-loss limit-information storage unit 10 (Step S204). Next, the inverter control device uses the magnet-temperature difference calculated at Step S203 and the magnetic-force temperature-characteristics data 20 read at Step S204 to calculate the rate of change in the magnetic force (Step S205).

Next, the inverter control device obtains the bus voltage to be applied to the inverter unit 6 (Step S206). Next, the inverter control device reads the synchronization-loss limit-bus-voltage data 18 from the synchronization-loss limit-information storage unit 10 (Step S207). Next, the inverter control device uses the bus voltage obtained at Step S206 and the synchronization-loss limit-bus-voltage data 18 read at Step S207 to calculate the bus voltage ratio (Step S208).

Next, the inverter control device reads the synchronization-loss limit-current data 17 from the synchronization-loss limit-information storage unit 10 (Step S209). Next, the inverter control device uses the bus voltage ratio calculated at Step S208 and the synchronization-loss limit-current data 17 read at Step S209 to calculate the limitation value on the synchronization-loss limit current (Step S210). The inverter control device then ends the process of calculating the limitation value on the synchronization-loss limit current illustrated in FIG. 3.

The process procedure from Step S201 to Step S205 illustrated in FIG. 3, which leads to the calculation of the rate of change in the magnetic force, is specifically described here by using an example with numerical values.

When the magnet temperature obtained at Step S201 is represented by Td1 and the synchronization-loss limit-magnet-temperature data read at Step S202 is represented by Tdx, then the magnet-temperature difference is calculated at Step S203 by using the following equation (1).

$$\text{Magnet-temperature difference} = Td1 - Tdx \quad (1)$$

When the magnetic-force temperature-characteristics data obtained at Step S204 is represented by A, the rate of change in the magnetic force is calculated at Step S205 by using the following equation (2).

$$\text{Rate of change in magnetic force} = 1 - ((Td1 - Tdx) \times A) \quad (2)$$

For example, when Td1 is 110(° C.) and Tdx is 100(° C.), then the magnet-temperature difference is calculated by using the above equation (1) as follows:

$$\text{Magnet-temperature difference} = 110 - 100 = 10(° C.)$$

For example, when A is 1(%/° C.), the rate of change in the magnetic force is calculated by using the above equation (2) as follows:

$$\text{Rate of change in magnetic force} = 1 - (10 \times 0.01) = 0.9$$

As described above, for example, when Td1 is 110(° C.), Tdx is 100(° C.), and A is 1(%/° C.), then the rate of change in the magnetic force is 0.9. This value is used for calculating the limitation value on the synchronization-loss limit current.

The process procedure from Step S206 to Step S208 illustrated in FIG. 3, which leads to the calculation of the bus voltage ratio, is specifically described here by using an example with numerical values.

When the bus voltage obtained at Step S206 is represented by Vdc1 and the synchronization-loss limit-bus-voltage data read at Step S207 is represented by Vdcx, then the bus voltage ratio is calculated at Step S208 by using the following equation (3).

$$\text{Bus voltage ratio} = Vdc1/Vdcx \quad (3)$$

For example, when Vdc1 is 90(V) and Vdcx is 100(V), then the bus voltage ratio is calculated by using the above equation (3) as follows:

$$\text{Bus voltage ratio} = 90/100 = 0.9$$

As described above, for example, when Vdc1 is 90(V) and Vdcx is 100(V), then the bus voltage ratio is 0.9. This value is used for calculating the limitation value on the synchronization-loss limit current.

The process procedure from Step S209 to Step S210 illustrated in FIG. 3, which leads to the calculation of the limitation value on the synchronization-loss limit current, is specifically described by using an example with numerical values here.

When the synchronization-loss limit-current data obtained at Step S209 is represented by Ix, the limitation value on the synchronization-loss limit current is calculated by using the following equation (4).

$$\text{Limitation value on synchronization-loss limit current} = (Ix) \times (\text{rate of change in magnetic force}) \times (\text{bus voltage ratio}) \quad (4)$$

For example, when Ix is 10 (A), the rate of change in the magnetic force is 0.9, and the bus voltage ratio is 0.9, then the limitation value on the synchronization-loss limit current is calculated by using the above equation (4) as follows:

$$\text{Limitation value on synchronization-loss limit current} = 10 \times 0.9 \times 0.9 = 8.1 \text{ (A)}$$

In the above example with numerical values, the inverter control device controls the operating frequency of the DC motor 7 such that the primary current becomes equal to or less than 8.1 (A).

The inverter control device uses the limitation value on the synchronization-loss limit current, calculated by using the above equation (4), and therefore it is made possible for the DC motor 7 to operate appropriately for the detected values of magnet temperature and bus voltage. The effect of the change in the detected values of magnet temperature and bus voltage on the operating state of the DC motor 7 is described below by using an example with numerical values.

First, the effect of the increase in the magnet temperature on the operating state of the DC motor 7 is described. As an example, when Td1 is 110(° C.) and the bus voltage ratio is 1, then the limitation value on the synchronization-loss limit current is calculated by using the above equation (4) as follows:

$$\text{Limitation value on synchronization-loss limit current} = 10 \times (1 - ((110 - 100) \times 0.01) \times 1 = 9 \text{ (A)}$$

When, as in the conventional manner, a fixed value is used as the limitation value on the synchronization-loss limit current, even though the magnet temperature increases from 100(° C.) to 110(° C.), the inverter control device still uses the limitation value that remains fixed at 10 (A), for example, to control the DC motor 7. However, as described above, when the magnet temperature increases to 110(° C.), the limitation value on the synchronization-loss limit current is calculated as 9 (A). Therefore, assuming that the limitation value on the synchronization-loss limit current that remains at 10 (A) is used for example, the DC motor 7 is operated in a state of higher primary current than the actual operational primary current and may be out of synchronization. In contrast, the inverter control device according to the first embodiment controls the DC motor 7 by using the limitation value=9 (A) calculated on the basis of the magnet temperature; therefore, it can prevent the DC motor 7 from being out of synchronization and can operate the DC motor 7 in a stable manner.

Next, the effect of the decrease in the magnet temperature on the operating state of the DC motor 7 is described. As an example, when Td1 is 90(° C.) and the bus voltage ratio is 1, then the limitation value on the synchronization-loss limit current is calculated by using the above equation (4) as follows:

Limitation value on synchronization-loss limit current=10×(1−((90−100)×0.01)×1=11 (A)

As described above, when the magnet temperature decreases to 90(° C.), the limitation value on the synchronization-loss limit current is 11 (A). Therefore, assuming that the limitation value on the synchronization-loss limit current that remains at 10 (A) is used for example, the DC motor 7 is operated in a state of lower primary current than the actual operational primary current. This excessively limits the operation range. In contrast, the inverter control device according to the first embodiment controls the DC motor 7 by using the limitation value=11 (A) calculated on the basis of the magnet temperature; therefore, it can operate the DC motor 7 in such a manner as to draw out its maximum possible performance, without imposing excessive limitations on the primary current within the range where a loss of synchronization is prevented.

Next, the effect of the increase in the bus voltage on the operating state of the DC motor 7 is described. As an example, when Vdc1 is 110(V) and the rate of change in the magnetic force is 1, then the limitation value on the synchronization-loss limit current is calculated by using the above equation (4) as follows:

Limitation value on synchronization-loss limit current=10×1×(110/100)=11 (A)

As described above, when the bus voltage increases to 110(V), the limitation value on the synchronization-loss limit current is calculated as 11 (A). Therefore, assuming that the limitation value on the synchronization-loss limit current that remains at 10 (A) is used for example, the DC motor 7 is operated in a state of lower primary current than the actual operational primary current. This excessively limits the operation range. In contrast, the inverter control device according to the first embodiment controls the DC motor 7 by using the limitation value=11 (A) calculated on the basis of the bus voltage; therefore, it can operate the DC motor 7 in such a manner as to draw out its maximum possible performance, without imposing excessive limitations on the primary current within the range where a loss of synchronization is prevented.

Next, the effect of the decrease in the bus voltage on the operating state of the DC motor 7 is described. As an example, when Vdc1 is 90(V) and the rate of change in the magnetic force is 1, then the limitation value on the synchronization-loss limit current is calculated by the above equation (4) as follows:

Limitation value on synchronization-loss limit current=10×1×(90/100)=9 (A)

As described above, when the bus voltage decreases to 90(V), the limitation value on the synchronization-loss limit current is calculated as 9 (A). Assuming that the limitation value on the synchronization-loss limit current that remains at 10 (A) is used for example, the DC motor 7 is operated in a state of higher primary current than the actual operational primary current and may be out of synchronization. In contrast, the inverter control device according to the first embodiment controls the DC motor 7 by using the limitation value=9 (A) calculated on the basis of the bus voltage; therefore, it can prevent the DC motor 7 from being out of synchronization and can operate the DC motor 7 in a stable manner.

As described above, the inverter control device according to the first embodiment calculates the limitation value on the synchronization-loss limit current on the basis of the magnet temperature and the bus voltage and controls the operation of the DC motor 7 on the basis of this limitation value. Therefore, in the first embodiment, with the control to prevent the DC motor 7 from discontinuing the operation due to a loss of synchronization, the inverter control device employs the magnet temperature and the bus voltage as an indicator to identify the operating state of the DC motor 7. Consequently, the inverter control device can execute the control according to the operating state. As a result, in the first embodiment, the inverter control device can not only prevent the DC motor from discontinuing the operation due to a loss of synchronization but also have the DC motor avoid an excessively-limited operation that is not appropriate for the operating state. Further, in the first embodiment, because the inverter control device executes the control according to the operating state, the service life of the DC motor 7 can be extended.

Second Embodiment

Figure 4:
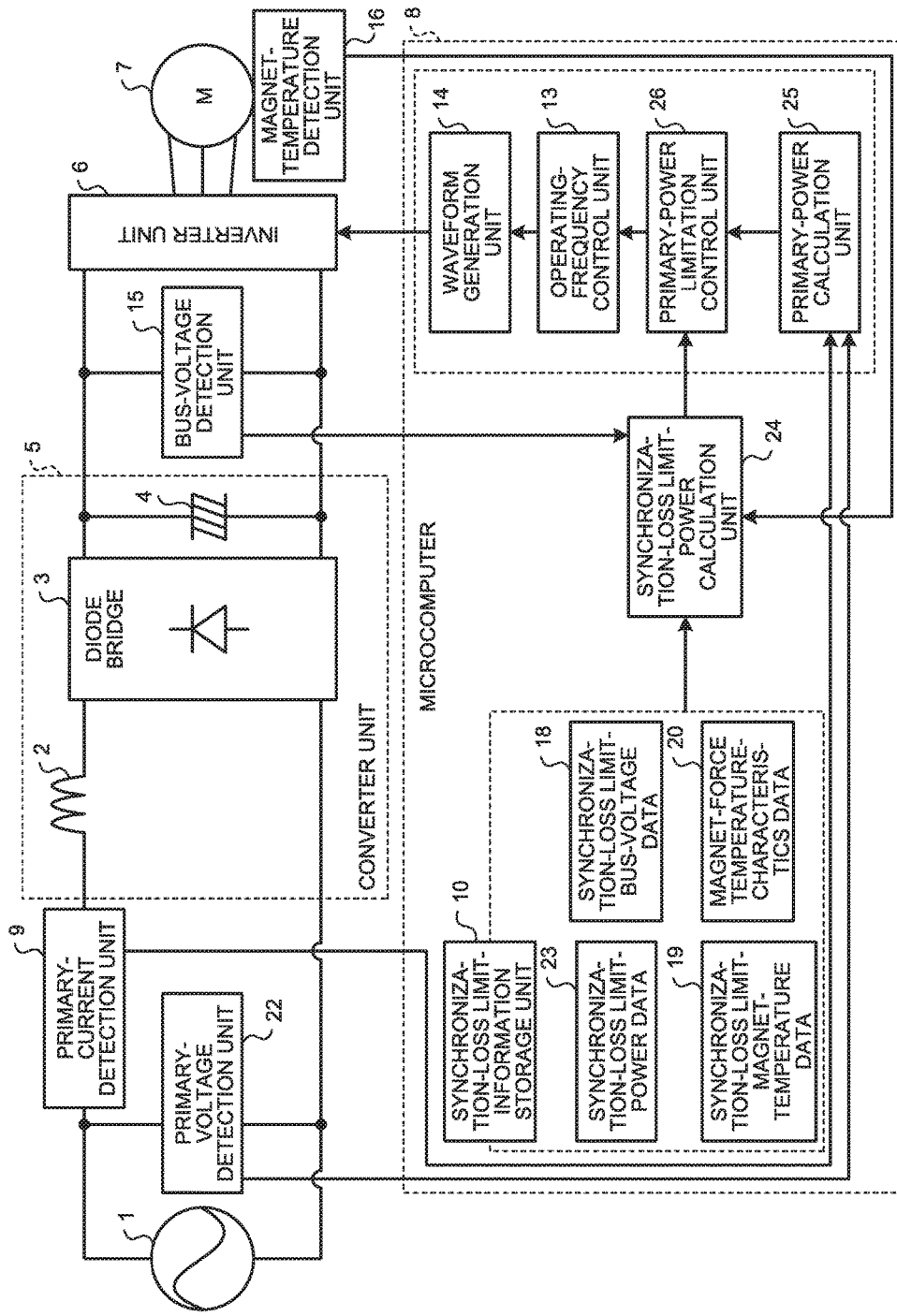
FIG. 4 is a schematic diagram illustrating a configuration of an inverter control device for driving a DC motor according to a second embodiment.

FIG. 4 is a schematic diagram illustrating a configuration of an inverter control device for driving a DC motor according to a second embodiment.

As illustrated in FIG. 4, the inverter control device according to the second embodiment includes the converter unit 5 that converts the AC voltage from the commercial AC power supply 1 to a DC voltage; the inverter unit 6 that converts the DC voltage from the converter unit 5 to an AC voltage and supplies the AC voltage to the DC motor 7; the microcomputer 8 that controls the inverter unit 6; the primary-current detection unit 9 that detects the primary current to be input to the converter unit 5; a primary-voltage detection unit 22 that detects the primary voltage to be applied to the converter unit 5; the bus-voltage detection unit 15 that detects the bus voltage to be applied to the inverter unit 6; and the magnet-temperature detection unit 16 that detects the magnet temperature of the DC motor 7. The converter unit 5 includes the reactor 2; the rectifying diode bridge 3; and the smoothing electrolytic capacitor 4. The inverter unit 6 includes switching elements (not illustrated) that are controlled to be turned on/off on the basis of the drive signal from the microcomputer 8, thereby converting the DC voltage generated by the converter unit 5 to a three-phase AC voltage. The DC motor 7 is connected to the inverter unit 6 and, by having the voltage to be supplied from the inverter unit 6 controlled, the DC motor 7 can operate at any operating frequency.

The microcomputer 8 includes a primary-power calculation unit 25 that calculates the primary power by using the primary current detected by the primary-current detection unit 9 and the primary voltage detected by the primary-voltage detection unit 22; the synchronization-loss limit-information storage unit 10 that stores therein synchronization-loss limit information; a synchronization-loss limit-power calculation unit 24 that calculates the limitation value on the synchronization-loss limit power by using the magnet temperature detected by the magnet-temperature detection unit 16, the bus voltage detected by the bus-voltage detection unit 15, and the synchronization-loss limit information stored in the synchronization-loss limit-information storage unit 10; a primary-power limitation control unit 26 that monitors the primary power and issues a command such that the primary power does not exceed the limitation value on the synchronization-loss limit power; the operating-frequency control unit 13 that controls the operating frequency on the basis of the command from the primary-power limitation control unit 26; and the waveform generation unit 14 that outputs a drive signal according to the output of the operating-frequency control unit 13. The microcomputer 8 is an example of the control unit.

The primary-power limitation control unit 26 compares the primary power calculated by the primary-power calculation unit 25 with the limitation value on the synchronization-loss limit power. When the primary power exceeds the limitation value, the primary-power limitation control unit 26 outputs to the operating-frequency control unit 13 an adjustment command to adjust the operating frequency of the DC motor 7 such that the primary power becomes equal to or less than the limitation value. The operating-frequency control unit 13 adjusts the operating frequency of the DC motor 7 on the basis of the adjustment command output from the primary-power limitation control unit 26 and outputs to the waveform generation unit 14 a generation command to generate a signal that corresponds to the adjusted operating frequency. The waveform generation unit 14 generates a drive signal that corresponds to the generation command output from the operating-frequency control unit 13 and outputs the drive signal to the inverter unit 6.

The synchronization-loss limit-information storage unit 10 stores therein, as synchronization-loss limit information, synchronization-loss limit-power data 23 that is the primary power at which the DC motor is out of synchronization, measured under certain given conditions; the synchronization-loss limit-bus-voltage data 18 that is the bus voltage at which a synchronization-loss limit is measured; the synchronization-loss limit-magnet-temperature data 19 that is the magnet temperature at which a synchronization-loss limit is measured; and the magnetic-force temperature-characteristics data 20 that is magnetic-force characteristics attributable to the magnet temperature of the DC motor 7. The synchronization-loss limit information is used for a process of calculating the limitation value on the synchronization-loss limit power by the microcomputer 8. The synchronization-loss limit-information storage unit 10 is an example of the storage unit. The synchronization-loss limit information is an example of information regarding a synchronization-loss limit.

With the control to prevent the DC motor 7 from discontinuing the operation due to a loss of synchronization, the inverter control device according to the second embodiment additionally includes the bus-voltage detection unit 15 that detects the bus voltage to be applied to the inverter unit 6; and the magnet-temperature detection unit 16 that detects the magnet temperature of the DC motor 7. Further, the inverter control device according to the second embodiment includes the synchronization-loss limit-power calculation unit 24 that calculates the limitation value on the synchronization-loss limit power on the basis of the magnet temperature of the DC motor 7; the bus voltage to be applied to the inverter unit 6; and the synchronization-loss limit information stored in the synchronization-loss limit-information storage unit 10. Furthermore, the inverter control device according to the second embodiment includes the primary-power calculation unit 25 that calculates the primary power on the basis of the primary current and the primary voltage. Further, the inverter control device according to the second embodiment includes the primary-power limitation control unit 26 that compares the limitation value on the synchronization-loss limit power with the primary power and that adjusts the operating frequency of the DC motor 7 such that the primary power becomes equal to or less than the limitation value, when the result of the comparison is that the primary power exceeds the limitation value. The inverter control device according to the second embodiment also includes the operating-frequency control unit 13 and the waveform generation unit 14. With this configuration, the inverter control device according to the second embodiment executes a control to prevent the DC motor from discontinuing the operation due to a loss of synchronization in such a manner that the control is executed according to the operating load.

Figure 5:
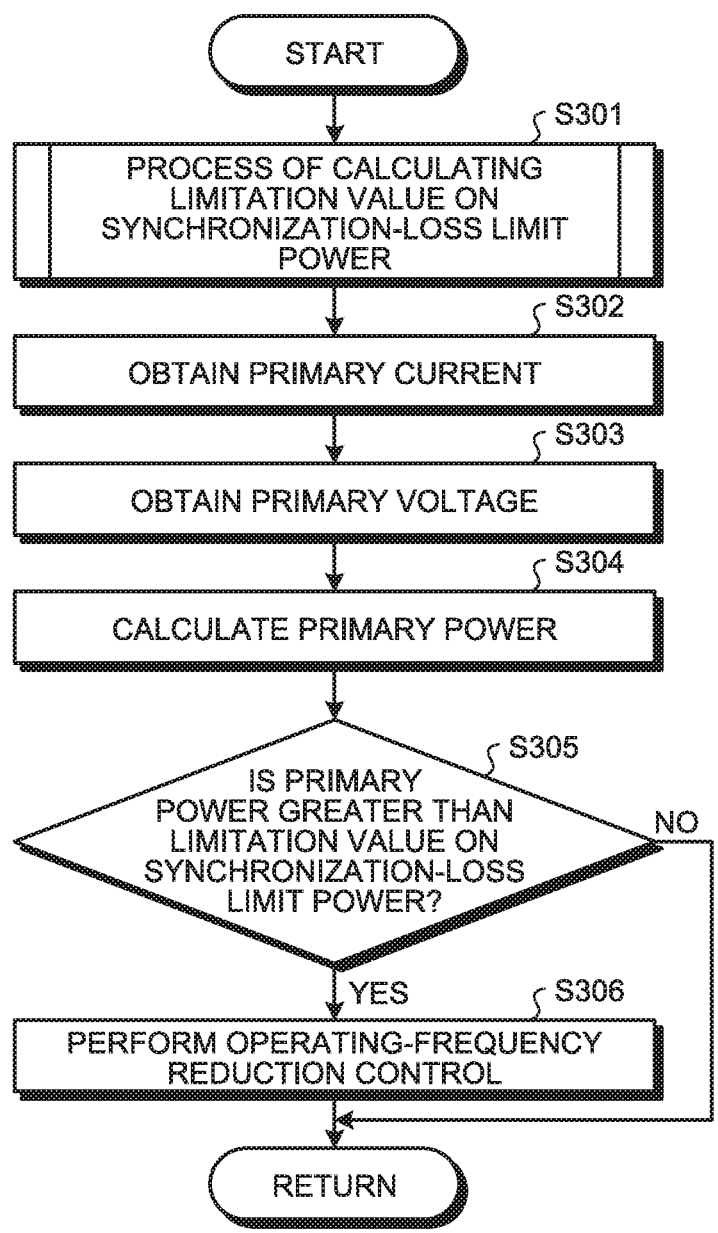
FIG. 5 is a flowchart illustrating a process flow according to the second embodiment.
Figure 6:
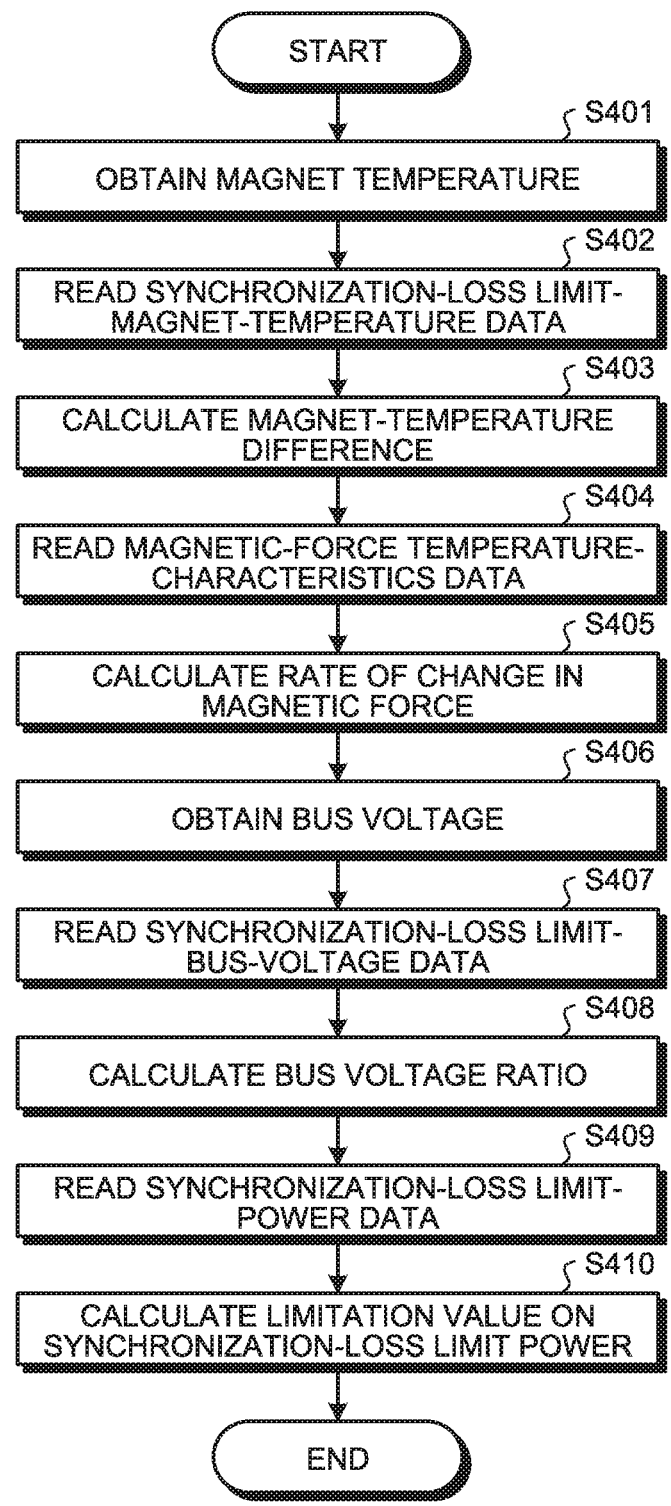
FIG. 6 is a flowchart illustrating a process flow according to the second embodiment.

With reference to FIGS. 5 and 6, an operation of the inverter control device according to the second embodiment is described. FIGS. 5 and 6 are flowcharts illustrating a process flow according to the second embodiment.

First, with reference to FIG. 5, a process flow is described for the synchronization-loss prevention control executed by the inverter control device according to the second embodiment.

As illustrated in FIG. 5, the inverter control device performs a process of calculating the limitation value on the synchronization-loss limit power (Step S301). The process of calculating the limitation value on the synchronization-loss limit power is described later with reference to FIG. 6. Next, the inverter control device obtains a primary current (Step S302). Next, the inverter control device obtains a primary voltage (Step S303). Next, the inverter control device calculates the primary power on the basis of the primary current obtained at Step S302 and the primary voltage obtained at Step S303 (Step S304). Next, the inverter control device compares the primary power calculated at Step S304 with the limitation value calculated by the process of calculating the limitation value on the synchronization-loss limit power at Step S301, and determines whether the primary power exceeds the limitation value (Step S305).

When the result of the determination at Step S305 is that the primary power exceeds the limitation value (YES at Step S305), the inverter control device executes a control to reduce the operating frequency of the DC motor 7 (Step S306) and then returns to Step S301. In contrast, when the result of the determination at Step S305 is that the primary power does not exceed the limitation value (NO at Step S305), the inverter control device directly returns to Step S301.

Next, with reference to FIG. 6, a process flow is described for calculating the limitation value on the synchronization-loss limit power in the inverter control device according to the second embodiment.

As illustrated in FIG. 6, the inverter control device obtains the magnet temperature of the DC motor 7 (Step S401). Next, the inverter control device reads the synchronization-loss limit-magnet-temperature data 19 from the synchronization-loss limit-information storage unit 10 (Step S402). Next, the inverter control device uses the magnet temperature obtained at Step S401 and the synchronization-loss limit-magnet-temperature data 19 read at Step S402 to calculate the magnet-temperature difference (Step S403).

Next, the inverter control device reads the magnetic-force temperature-characteristics data 20 from the synchronization-loss limit-information storage unit 10 (Step S404). Next, the inverter control device uses the magnet-temperature difference calculated at Step S403 and the magnetic-force temperature-characteristics data 20 read at Step S404 to calculate the rate of change in the magnetic force (Step S405).

Next, the inverter control device obtains the bus voltage to be applied to the inverter unit 6 (Step S406). Next, the inverter control device reads the synchronization-loss limit-bus-voltage data 18 from the synchronization-loss limit-information storage unit 10 (Step S407). Next, the inverter control device uses the bus voltage obtained at Step S406 and the synchronization-loss limit-bus-voltage data 18 read at Step S407 to calculate the bus voltage ratio (Step S408).

Next, the inverter control device reads the synchronization-loss limit-power data 23 from the synchronization-loss limit-information storage unit 10 (Step S409). Next, the inverter control device uses the bus voltage ratio calculated at Step S408 and the synchronization-loss limit-power data 23 read at Step S409 to calculate the limitation value on the synchronization-loss limit power (Step S410). The inverter control device then ends the process of calculating the limitation value on the synchronization-loss limit power illustrated in FIG. 6.

The process procedure from Step S401 to Step S405 illustrated in FIG. 6, which leads to the calculation of the rate of change in the magnetic force, is the same as the process procedure from Step S201 to Step S205 illustrated in FIG. 3 and described above in the first embodiment. Also, the process procedure from Step S406 to S408 illustrated in FIG. 6, which leads to the calculation of the bus voltage ratio, is the same as the process procedure from Step S206 to Step S208 illustrated in FIG. 3 and described above in the first embodiment. The process procedure from Step S409 to Step S410 illustrated in FIG. 6, which leads to the calculation of the limitation value on the synchronization-loss limit power, is specifically described here by using an example with numerical values.

When the synchronization-loss limit-power data obtained at Step S409 is represented by Px, the limitation value on the synchronization-loss limit power is calculated by using the following equation (5).

Limitation value on synchronization-loss limit power=($Px$)×(rate of change in magnetic force)×(bus voltage ratio)　　(5)

For example, when Px is 1000 (W), the rate of change in the magnetic force is 0.9, and the bus voltage ratio is 0.9, then the limitation value on the synchronization-loss limit power is calculated by using the above equation (5) as follows:

Limitation value on synchronization-loss limit power=1000 (W)×0.9×0.9=810 (W)

In the above example with numerical values, the inverter control device controls the operating frequency of the DC motor 7 such that the primary power becomes equal to or less than 810 (W).

The inverter control device uses the limitation value on the synchronization-loss limit power, calculated by using the above equation (5), and therefore it is made possible for the DC motor 7 to operate appropriately for the detected values of magnet temperature and bus voltage. The effect of the change in the detected values of magnet temperature and bus voltage on the operating state of the DC motor 7 is described below by using an example with numerical values.

First, the effect of the increase in the magnet temperature on the operating state of the DC motor 7 is described. As an example, when Td1 is 110(° C.) and the bus voltage ratio is 1, then the limitation value on the synchronization-loss limit power is calculated by using the above equation (4) as follows:

Limitation value on synchronization-loss limit power=1000×(1−((110−100)×0.01)×1=900 (W)

As in the conventional manner, when a fixed value is used as the limitation value on the synchronization-loss limit power, even though the magnet temperature increases from 100(° C.) to 110(° C.), the inverter control device still uses the limitation value that remains fixed at 1000 (W), for example, to control the DC motor 7. However, as described above, when the magnet temperature increases to 110(° C.), the limitation value on the synchronization-loss limit power is calculated as 900 (W). Therefore, assuming that the limitation value on the synchronization-loss limit power that remains at 1000 (W) is used for example, the DC motor 7 is operated in a state of higher primary power than the actual operational primary power and may be out of synchronization. In contrast, the inverter control device according to the second embodiment controls the DC motor 7 by using the limitation value=900 (W) calculated on the basis of the magnet temperature; therefore, it can prevent the DC motor 7 from being out of synchronization and can operate the DC motor 7 in a stable manner.

Next, the effect of the decrease in the magnet temperature on the operating state of the DC motor 7 is described. As an example, when Td1 is 90(° C.) and the bus voltage ratio is 1, then the limitation value on the synchronization-loss limit power is calculated by using the above equation (5) as follows:

Limitation value on synchronization-loss limit power=1000×(1−((90−100)×0.01)×1=1100 (W)

As described above, when the magnet temperature decreases to 90(° C.), the limitation value on the synchronization-loss limit power is 1100 (W). Therefore, assuming that the limitation value on the synchronization-loss limit power that remains at 1000 (W) is used for example, the DC motor 7 is operated in a state of lower primary power than the actual operational primary power. This excessively limits the operation range. In contrast, the inverter control device according to the second embodiment controls the DC motor 7 by using the limitation value=1100 (W) calculated on the basis of the magnet temperature; therefore, it can operate the DC motor 7 at the maximum capacity within the range where a loss of synchronization is prevented, without imposing excessive limitations on the primary power.

Next, the effect of the increase in the bus voltage on the operating state of the DC motor 7 is described. As an example, when Vdc1 is 110(V) and the rate of change in the magnetic force is 1, then the limitation value on the synchronization-loss limit power is calculated by using the above equation (5) as follows:

Limitation value on synchronization-loss limit power=1000×1×(110/100)=1100 (W)

As described above, when the bus voltage increases to 110(V), the limitation value on the synchronization-loss limit power is calculated as 1100 (W). Therefore, assuming that the limitation value on the synchronization-loss limit power that remains at 1000 (W) is used for example, the DC motor 7 is operated in a state of lower primary power than the actual operational primary power. This excessively limits the operation range. In contrast, the inverter control device according to the second embodiment controls the DC motor 7 by using the limitation value=1100 (W) calculated on the basis of the bus voltage; therefore, it can operate the DC motor 7 in such a manner as to draw out its maximum possible performance, without imposing excessive limitations on the primary power within the range where a loss of synchronization is prevented.

Next, the effect of the decrease in the bus voltage on the operating state of the DC motor 7 is described. As an example, when Vdc1 is 90(V) and the rate of change in the magnetic force is 1, then the limitation value on the synchronization-loss limit power is calculated by the above equation (5) as follows:

Limitation value on synchronization-loss limit power=1000×1×(90/100)=900 (W)

As described above, when the bus voltage decreases to 90(V), the limitation value on the synchronization-loss limit power is calculated as 900 (W). Assuming that the limitation value on the synchronization-loss limit power that remains at 1000 (W) is used for example, the DC motor 7 is operated in a state of higher primary power than the actual operational primary power and may be out of synchronization. In contrast, the inverter control device according to the second embodiment controls the DC motor 7 by using the limitation value=900 (W) calculated on the basis of the bus voltage; therefore, it can prevent the DC motor 7 from being out of synchronization and can operate the DC motor 7 in a stable manner.

As described above, the inverter control device according to the second embodiment calculates the limitation value on the synchronization-loss limit power on the basis of the magnet temperature and the bus voltage and controls the operation of the DC motor 7 on the basis of this limitation value. Therefore, in the second embodiment, with the control to prevent the DC motor 7 from discontinuing the operation due to a loss of synchronization, the inverter control device employs the magnet temperature and the bus voltage as an indicator to identify the operating state of the DC motor 7. Consequently, the inverter control device can execute the control according to the operating state. As a result, in the second embodiment, the inverter control device can not only prevent the DC motor from discontinuing the operation due to a loss of synchronization but also have the DC motor avoid an excessively-limited operation that is not appropriate for the operating state. Further, in the second embodiment, because the inverter control device executes the control according to the operating state, the service life of the DC motor 7 can be extended.

Third Embodiment

Figure 7:
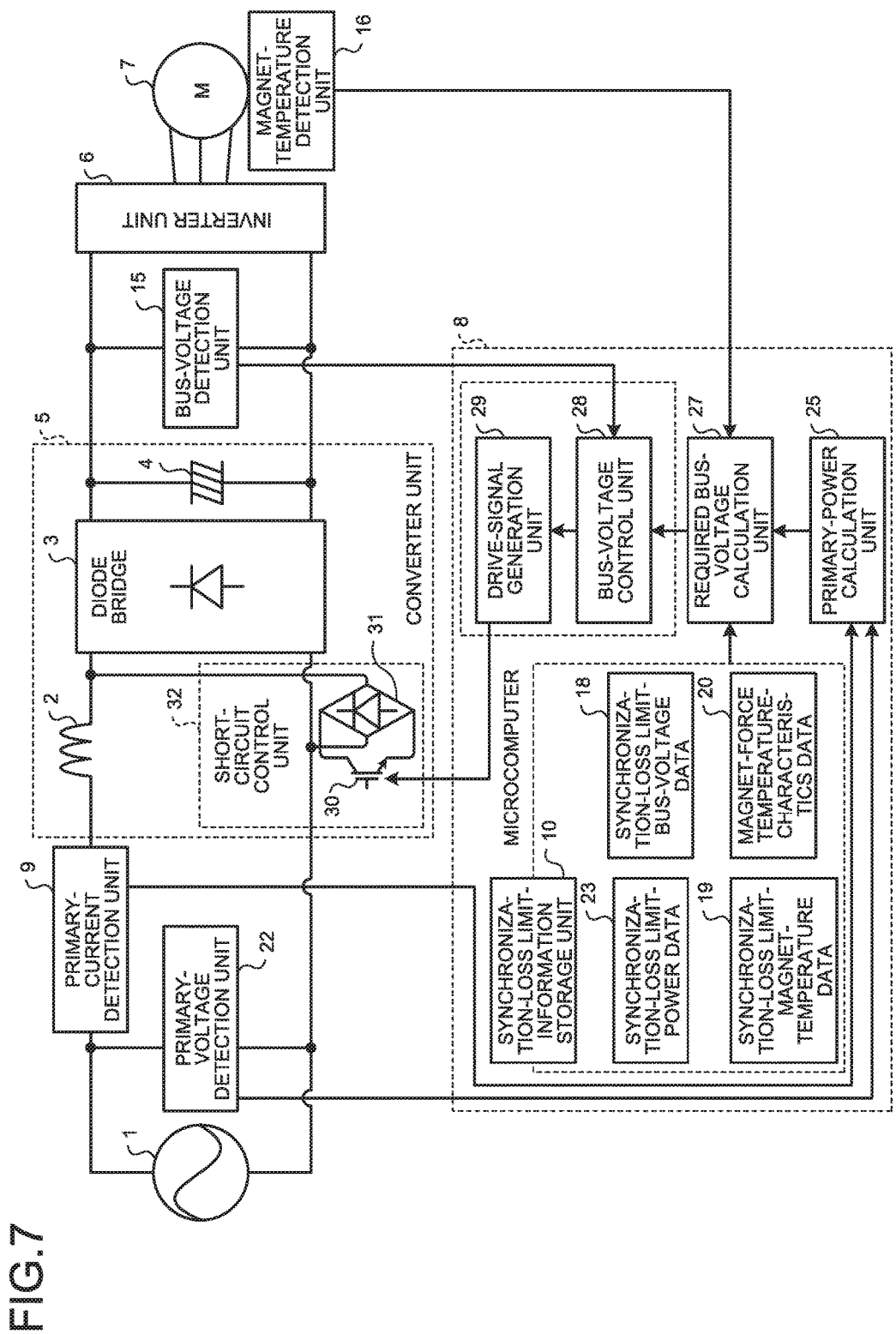
FIG. 7 is a schematic diagram illustrating a configuration of an inverter control device for driving a DC motor according to a third embodiment.

FIG. 7 is a schematic diagram illustrating a configuration of an inverter control device for driving a DC motor according to a third embodiment.

As illustrated in FIG. 7, the inverter control device according to the third embodiment includes the converter unit 5 that converts the AC voltage from the commercial AC power supply 1 to a DC voltage; the inverter unit 6 that converts the DC voltage from the converter unit 5 to an AC voltage and supplies the AC voltage to the DC motor 7; a short-circuit control unit 32 that is incorporated in the converter unit 5 and that controls the DC voltage to be applied from the converter unit 5 to the inverter unit 6 by a diode bridge 31 driven by the switching of a short-circuit element 30; the microcomputer 8 that controls the inverter unit 6; the primary-current detection unit 9 that detects the primary current to be input to the converter unit 5; the primary-voltage detection unit 22 that detects the primary voltage to be applied to the converter unit 5; the bus-voltage detection unit 15 that detects the DC voltage to be applied to the inverter unit 6 as the bus voltage; and the magnet-temperature detection unit 16 that detects the magnet temperature of the DC motor 7. The converter unit 5 includes the reactor 2; the rectifying diode bridge 3; and the smoothing electrolytic capacitor 4. The inverter unit 6 includes switching elements (not illustrated) that are controlled to be turned on/off on the basis of the drive signal from the microcomputer 8, thereby converting the DC voltage generated by the converter unit 5 to a three-phase AC voltage. The DC motor 7 is connected to the inverter unit 6 and, by having the voltage to be supplied from the inverter unit 6 controlled, the DC motor 7 can operate at any operating frequency.

The microcomputer 8 includes the primary-power calculation unit 25 that calculates the primary power by using the primary current detected by the primary-current detection unit 9 and the primary voltage detected by the primary-voltage detection unit 22; the synchronization-loss limit-information storage unit 10 that stores therein synchronization-loss limit information; a required bus-voltage calculation unit 27 that calculates the required bus voltage, required to drive the DC motor 7 in a stable manner, by using the magnet temperature detected by the magnet-temperature detection unit 16, the primary power calculated by the primary-power calculation unit 25, and the synchronization-loss limit information stored in the synchronization-loss limit-information storage unit 10; a bus-voltage control unit 28 that issues a command in order that the bus voltage detected by the bus-voltage detection unit 15 is constantly equal to or higher than the required bus voltage; and a drive-signal generation unit 29 that outputs a drive signal to the short-circuit control unit 32 on the basis of the command from the bus-voltage control unit 28. The microcomputer 8 is an example of the control unit. The required bus-voltage calculation unit 27 is an example of the bus-voltage calculation unit.

The required bus-voltage calculation unit 27 calculates the required bus voltage required to drive the DC motor 7 on the basis of the primary power calculated by the primary-power calculation unit 25 and the synchronization-loss limit information. The bus-voltage control unit 28 compares the bus voltage detected by the bus-voltage detection unit 15 with the required bus voltage. When the bus voltage is equal to or lower than the required bus voltage, the bus-voltage control unit 28 outputs to the drive-signal generation unit 29 a generation command to generate a drive signal such that the bus voltage becomes equal to or higher than the required bus voltage. In contrast, when the bus voltage exceeds the required bus voltage, the bus-voltage control unit 28 outputs to the drive-signal generation unit 29 a generation command to generate a drive signal such that the bus voltage becomes equal to or lower than the required bus voltage. The drive-signal generation unit 29 generates a drive signal that corresponds to the generation command output from the bus-voltage control unit 28 and outputs the drive signal to the short-circuit control unit 32. The bus voltage detected by the bus-voltage detection unit 15 is an example of the first bus voltage. The required bus voltage calculated by the required bus-voltage calculation unit 27 is an example of the second bus voltage.

The synchronization-loss limit-information storage unit 10 stores therein, as synchronization-loss limit information, the synchronization-loss limit-power data 23 that is the primary power at which the DC motor 7 is out of synchronization, measured under certain given conditions; the synchronization-loss limit-bus-voltage data 18 that is the bus voltage at which a synchronization-loss limit is measured; the synchronization-loss limit-magnet-temperature data 19 that is the magnet temperature at which a synchronization-loss limit is measured; and the magnetic-force temperature-characteristics data 20 that is magnetic-force characteristics attributable to the magnet temperature of the DC motor. The synchronization-loss limit information is used for a process of calculating the required bus voltage by the microcomputer 8. The synchronization-loss limit-information storage unit 10 is an example of the storage unit. The synchronization-loss limit information is an example of information regarding a synchronization-loss limit.

With the control to prevent the DC motor 7 from discontinuing the operation due to a loss of synchronization, the inverter control device according to the third embodiment additionally includes the bus-voltage detection unit 15 that detects the bus voltage to be applied to the inverter unit 6; and the magnet-temperature detection unit 16 that detects the magnet temperature of the DC motor 7. Further, the inverter control device according to the third embodiment includes the required bus-voltage calculation unit 27 that calculates the required bus voltage on the basis of the magnet temperature of the DC motor 7; the bus voltage to be applied to the inverter unit 6; and the synchronization-loss limit information stored in the synchronization-loss limit-information storage unit 10. Furthermore, the inverter control device according to the third embodiment includes the bus-voltage control unit 28 that compares the bus voltage to be applied to the inverter unit 6 with the required bus voltage so as to control the bus voltage, and it also includes the drive-signal generation unit 29. With this configuration, the inverter control device according to the third embodiment executes a control to prevent the DC motor from discontinuing the operation due to a loss of synchronization in such a manner that the control is executed according to the operating state.

Figure 8:
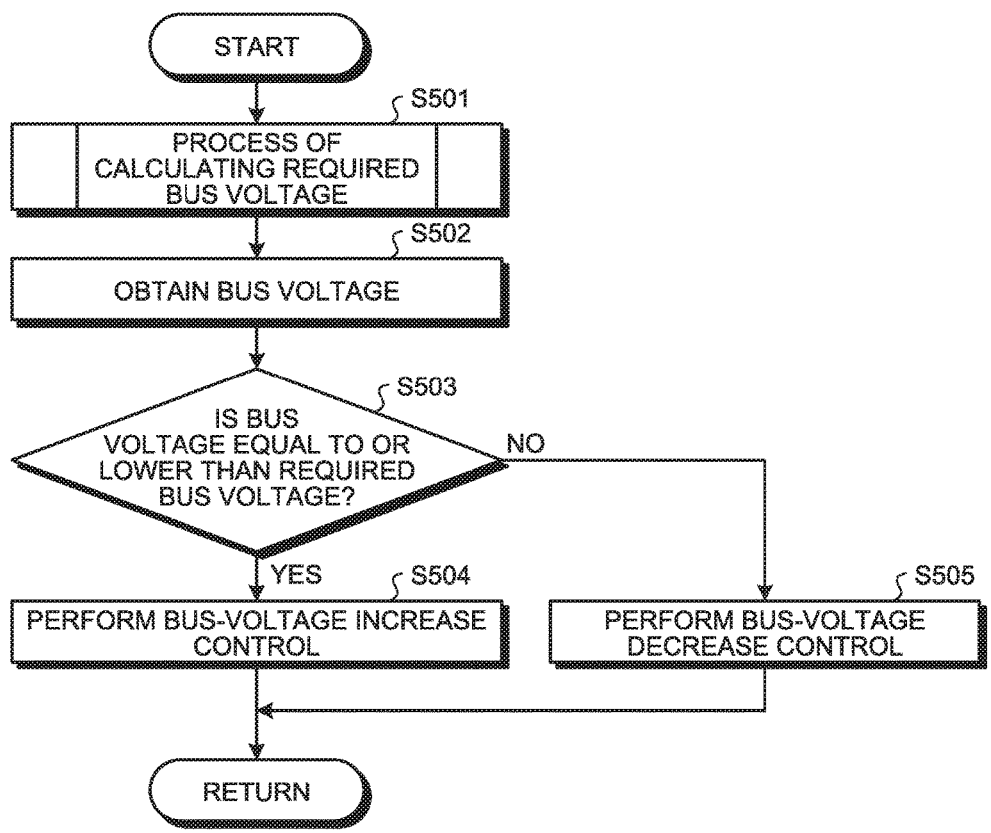
FIG. 8 is a flowchart illustrating a process flow according to the third embodiment.
Figure 9:
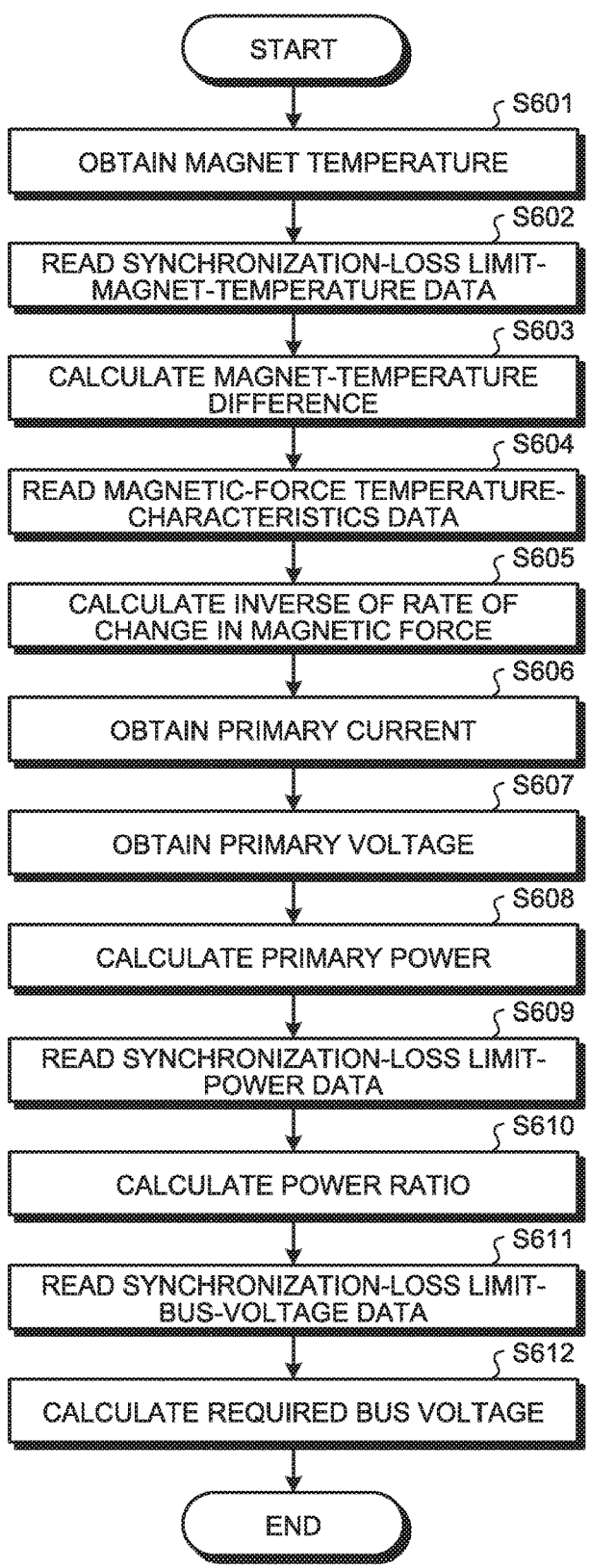
FIG. 9 is a flowchart illustrating a process flow according to the third embodiment.

With reference to FIGS. 8 and 9, an operation of the inverter control device according to the third embodiment is described. FIGS. 8 and 9 are flowcharts illustrating a process flow according to the third embodiment.

First, with reference to FIG. 8, a process flow is described for the synchronization-loss prevention control executed by the inverter control device according to the third embodiment.

As illustrated in FIG. 8, the inverter control device performs a process of calculating the required bus voltage (Step S501). The process of calculating the required bus voltage is described later with reference to FIG. 9. Next, the inverter control device obtains a bus voltage (Step S502). Next, the inverter control device compares the bus voltage obtained at Step S502 with the required bus voltage calculated by the process of calculating the required bus voltage at Step S501, and determines whether the bus voltage is equal to or lower than the required bus voltage (Step S503).

When the result of the determination at Step S503 is that the bus voltage is equal to or lower than the required bus voltage (YES at Step S503), the inverter control device executes a bus voltage increase control (Step S504) and then returns to Step S501 in the process procedure. In contrast, when the result of the determination at Step S503 is that the bus voltage is higher than the required bus voltage (NO at Step S503), the inverter control device executes a bus voltage decrease control (Step S505) and then returns to Step S501 in the process procedure.

Next, with reference to FIG. 9, a process flow is described for calculating the required bus voltage in the inverter control device according to the third embodiment.

As illustrated in FIG. 9, the inverter control device obtains the magnet temperature of the DC motor 7 (Step S601). Next, the inverter control device reads the synchronization-loss limit-magnet-temperature data 19 from the synchronization-loss limit-information storage unit 10 (Step S602). Next, the inverter control device uses the magnet temperature obtained at Step S601 and the synchronization-loss limit-magnet-temperature data 19 read at Step S602 to calculate the magnet-temperature difference (Step S603).

Next, the inverter control device reads the magnetic-force temperature-characteristics data 20 from the synchronization-loss limit-information storage unit 10 (Step S604). Next, the inverter control device uses the magnet-temperature difference calculated at Step S603 and the magnetic-force temperature-characteristics data 20 read at Step S604 to calculate the inverse of the rate of change in the magnetic force (Step S605).

Next, the inverter control device obtains the primary current detected by the primary-current detection unit 9 (Step S606). Next, the inverter control device obtains the primary voltage detected by the primary-voltage detection unit 22 (Step S607). Next, the inverter control device calculates the primary power on the basis of the primary current obtained at Step S606 and the primary voltage obtained at Step S607 (Step S608).

Next, the inverter control device reads the synchronization-loss limit-power data 23 from the synchronization-loss limit-information storage unit 10 (Step S609). Next, the inverter control device uses the primary power obtained at Step S608 and the synchronization-loss limit-power data 23 read at Step S609 to calculate the power ratio (Step S610).

Next, the inverter control device reads the synchronization-loss limit-bus-voltage data 18 from the synchronization-loss limit-information storage unit 10 (Step S611). Next, the inverter control device uses the power ratio calculated at Step S610 and the synchronization-loss limit-bus-voltage data 18 read at Step S611 to calculate the required bus voltage (Step S612).

The process procedure from Step S601 to Step S605 illustrated in FIG. 9, which leads to the calculation of the inverse of the rate of change in the magnetic force, is specifically described by using an example with numerical values. The process procedure from Step S601 to Step S604 illustrated in FIG. 9 is the same as the process procedure in the above embodiments. Each variable included in the equations described below has the same meaning as in the above embodiments.

When the rate of change in the magnetic force is expressed by the above equation (2), the inverse of the rate of change in the magnetic force is expressed by the following equation (6):

$$\text{Inverse of rate of change in magnetic force} = 1/(1-((Td1-Tdx)\times A)) \quad (6)$$

For example, when Td1 is 120(° C.), Tdx is 100(° C.), and A is 1(%/° C.), then the inverse of the rate of change in the magnetic force is calculated by using the above equation (6) as follows:

Inverse of rate of change in magnetic force =
$$1/(1-((120-100)\times 0.01)) = 1/(1-(20\times 0.01)) = 1/(1-0.2) = 1.25$$

When the primary power is represented by P1, the power ratio is expressed by the following equation (7).

$$\text{Power ratio} = P1/Px \qquad (7)$$

When P1 is 900 (W) and Px is 1000 (W), then the power ratio is calculated by using the above equation (7) as follows:

Power ratio=900/1000=0.9

The required bus voltage is expressed by the following equation (8).

$$\text{Required bus voltage} = (Vdcx)\times(\text{inverse of rate of change in magnetic force})\times(\text{power ratio}) \qquad (8)$$

When Vdcx is 100(V), the inverse of the rate of change in magnetic force is 1.25, and the power ratio is 0.9, then the required bus voltage is calculated by using the above equation (8) as follows:

Required bus voltage=100×1.25×0.9=112.5(V)

In the above example with numerical values, the inverter control device controls the operation of the DC motor 7 on the basis of the required bus voltage of 112.5(V).

The inverter control device uses the required bus voltage calculated by using the above equation (8), and therefore it is made possible for the DC motor 7 to operate appropriately for the detected values of magnet temperature and primary power. The effect of the change in the detected values of magnet temperature and primary power on the operating state of the DC motor 7 is described below by using an example with numerical values.

First, the effect of the increase in the magnet temperature on the operating state of the DC motor 7 is described. As an example, when Td1 is 120(° C.) and the power ratio is 1, then the required bus voltage is calculated by using the above equation (8) as follows:

Required bus voltage=100×1/(1−((120−100)×0.01))×
1=125(V)

When, as in the conventional manner, the inverter control device controls the DC motor 7 without controlling the bus voltage according to the operating state, even though the magnet temperature increases from 100(° C.) to 120(° C.), the inverter control device still uses the bus voltage that remains at 100(V), for example, to control the DC motor 7. However, as described above, when the magnet temperature increases to 120(° C.), the required bus voltage is calculated as 125(V). Therefore, assuming that the bus voltage that remains at 100(V) is used, the DC motor 7 is operated by a lower bus voltage than the actual bus voltage required for the operation and may be out of synchronization. In contrast, the inverter control device according to the third embodiment controls the DC motor 7 by using the required bus voltage=125(V) calculated on the basis of the magnet temperature; therefore, it can prevent the DC motor 7 from being out of synchronization and can operate the DC motor 7 in a stable manner.

Next, the effect of the decrease in the magnet temperature on the operating state of the DC motor 7 is described. As an example, when Td1 is 75(° C.) and the power ratio is 1, then the required bus voltage is calculated by using the above equation (8) as follows:

Required bus voltage=100×1/(1−((75−100)×0.01))×
1=80(V)

As described above, when the magnet temperature decreases to 75(° C.), the required bus voltage is calculated as 80(V). Therefore, assuming that the bus voltage that remains at 100(V) is used, the DC motor 7 is operated by a higher bus voltage than the actual bus voltage required for the operation, and accordingly there is no likelihood of a loss of synchronization. However, the bus voltage is increased unnecessarily and this causes a problem in that there is an increase in switching loss. In contrast, the inverter control device according to the third embodiment controls the DC motor 7 by using the required bus voltage=80(V) calculated on the basis of the magnet temperature; therefore, it can reduce the switching loss when compared to the control in which the bus voltage is increased unnecessarily.

Next, the effect of the increase in the primary power on the operating state of the DC motor 7 is described. As an example, when P1 is 1100 (W) and the inverse of the rate of change in the magnetic force is 1, then the required bus voltage is calculated by using the above equation (8) as follows:

Required bus voltage=100×1×(1100/1000)=110(V)

As described above, when the primary power increases to 1100 (W), the required bus voltage is calculated as 110(V). Therefore, assuming that the bus voltage that remains at 100(V) is used, the DC motor 7 is operated by a lower bus voltage than the actual bus voltage required for the operation and may be out of synchronization. In contrast, the inverter control device according to the third embodiment controls the DC motor 7 by using the required bus voltage=110(V) calculated on the basis of the primary power; therefore, it can prevent the DC motor 7 from being out of synchronization and can operate the DC motor 7 in a stable manner.

Next, the effect of the decrease in the primary power on the operating state of the DC motor 7 is described. As an example, when P1 is 900 (W) and the inverse of the rate of change in the magnetic force is 1, then the required bus voltage is calculated by using the above equation (8) as follows:

Required bus voltage=100×1×(900/1000)=90(V)

As described above, when the primary power decreases to 900 (W), the required bus voltage is calculated as 90(V). Therefore, assuming that the bus voltage that remains at 100(V) is used, the DC motor 7 is operated by a higher bus voltage than the actual bus voltage required for the operation, and accordingly there is no likelihood of a loss of synchronization. However, the bus voltage is increased unnecessarily and this causes a problem in that there is an increase in switching loss. In contrast, the inverter control device according to the third embodiment controls the DC motor 7 by using the required bus voltage=90(V) calculated on the basis of the primary voltage; therefore, it can reduce the switching loss when compared to the control in which the bus voltage is increased unnecessarily.

As described above, the inverter control device according to the third embodiment calculates the required bus voltage on the basis of the magnet temperature and the primary power. The inverter control device according to the third embodiment controls the bus voltage to be applied to the inverter unit 6 on the basis of the required bus voltage. Therefore, in the third embodiment, with the control to prevent the DC motor from discontinuing the operation due to a loss of synchronization, the inverter control device employs the magnet temperature and the primary power as an indicator to identify the operating state of the DC motor 7. Consequently, the inverter control device can execute the control according to the operating state. Further, in the third embodiment, the operation of the DC motor is controlled within the range where the bus voltage to be applied to the inverter unit 6 does not significantly exceed the required bus voltage. Therefore, the switching loss can also be reduced. Furthermore, in the third embodiment, as a result of the fact that the switching loss can be reduced, the energy consumption can be reduced. Further, in the third embodiment, as a result of the fact that the energy consumption can be reduced, the environmental load can be reduced.

When the magnet-temperature detection unit 16 according to the above embodiments uses the temperature of a discharge pipe portion of a compressor that uses the inverter control device for a DC motor or the temperature of a shell portion of the compressor, or uses the temperature of the shell side-surface of the compressor or the temperature of the shell bottom-surface of the compressor, the magnet-temperature detection unit 16 also has effects equivalent to those in the above embodiments. The magnet-temperature detection unit 16 is not limited to detecting the temperature directly from the magnet portion of the DC motor 7. For example, it is also possible that the magnet-temperature detection unit 16 includes a unit that detects the ambient temperature of the magnet portion of the DC motor 7 and can convert the detected ambient temperature to the magnet temperature.

The inverter control device according to the above embodiments can be applied to an air conditioner. The inverter control device according to the above embodiments executes a control to prevent the air conditioner from being out of synchronization, and therefore it can operate the air conditioner at high capacity in a stable manner.

The functions of the inverter control device according to the above embodiments, which are performed by the primary-current limitation control unit 12, the operating-frequency control unit 13, the waveform generation unit 14, the synchronization-loss limit-current calculation unit 21, the synchronization-loss limit-power calculation unit 24, the primary-power calculation unit 25, the primary-power limitation control unit 26, the required bus-voltage calculation unit 27, the bus-voltage control unit 28, and the drive-signal generation unit 29, are implemented by a processing circuit such as a CPU (Central Processing Unit) that executes a program stored in a memory, or a system LSI (Large Scale Integration). It is also possible that a plurality of processing circuits coordinate with each other to implement each of the above functions.

The configuration described in the above embodiments is only an example of the content of the present invention. The configuration can be combined with other well-known techniques, and it can be modified or a part the configuration can be omitted without departing from the scope of the invention.

The invention claimed is:

1. An inverter control device that controls an inverter unit that converts a DC voltage from a converter unit to an AC voltage and supplies the AC voltage to a DC motor, where the converter unit converts a voltage from a commercial AC power supply to a DC voltage, the inverter control device comprising:
a magnet-temperature detection unit that detects a magnet temperature of the DC motor;
a bus-voltage detection unit that detects, as a bus voltage, a DC voltage to be applied to the inverter unit;
a primary-current detection unit that detects a primary current to be input to the converter unit; and
a control unit that controls the inverter unit, wherein
the control unit includes
a storage unit that stores therein information regarding a synchronization-loss limit,
a synchronization-loss limit-current calculation unit that calculates a limitation value on a synchronization-loss limit current on a basis of the magnet temperature, the bus voltage, and the information regarding the synchronization-loss limit,
a primary-current limitation control unit that compares the primary current with the limitation value and that, when the primary current exceeds the limitation value, outputs an adjustment command to adjust an operating frequency of the DC motor such that the primary current becomes equal to or less than the limitation value,
an operating-frequency control unit that adjusts the operating frequency on basis of the adjustment command and that outputs a generation command to generate a signal corresponding to the operating frequency, and
a waveform generation unit that generates a drive signal corresponding to the generation command and that outputs the drive signal to the inverter unit.

2. The inverter control device according to claim 1, wherein
the storage unit stores therein synchronization-loss limit-magnet-temperature data, magnetic-force temperature-characteristics data, and synchronization-loss limit-current data as the information regarding the synchronization-loss limit, and
the synchronization-loss limit-current calculation unit
calculates a magnet-temperature difference on a basis of the magnet temperature and the synchronization-loss limit-magnet-temperature data,
calculates a rate of change in magnetic force on a basis of the magnet-temperature difference and the magnetic-force temperature-characteristics data, and
calculates the limitation value on a basis of the rate of change in magnetic force and the synchronization-loss limit-current data.

3. The inverter control device according to claim 1, wherein
the storage unit stores therein synchronization-loss limit-current data and synchronization-loss limit-bus-voltage data as the information regarding the synchronization-loss limit, and
the synchronization-loss limit-current calculation unit
calculates a bus voltage ratio on a basis of the bus voltage and the synchronization-loss limit-bus-voltage data, and
calculates a bus voltage ratio on a basis of the bus voltage and the synchronization-loss limit-current data.

4. The inverter control device according to claim 1, wherein the magnet-temperature detection unit calculates a magnet temperature by converting a temperature detected indirectly from a magnet to a magnet temperature.

5. An air conditioner comprising the inverter control device according to claim 1.

6. An inverter control device that controls an inverter unit that converts a DC voltage from a converter unit to an AC voltage and supplies the AC voltage to a DC motor, where the converter unit converts a voltage from a commercial AC power supply to a DC voltage, the inverter control device comprising:
   a magnet-temperature detection unit that detects a magnet temperature of the DC motor;
   a bus-voltage detection unit that detects, as a bus voltage, a DC voltage to be applied to the inverter unit;
   a primary-current detection unit that detects a primary current to be input to the converter unit;
   a primary-voltage detection unit that detects a primary voltage to be applied to the converter unit; and
   a control unit that controls the inverter unit, wherein
   the control unit includes
      a storage unit that stores therein information regarding a synchronization-loss limit,
      a synchronization-loss limit-power calculation unit that calculates a limitation value on synchronization-loss limit power on a basis of the magnet temperature, the bus voltage, and the information regarding the synchronization-loss limit,
      a primary-power calculation unit that calculates primary power on a basis of the primary current and the primary voltage,
      a primary-power limitation control unit that compares the primary power with the limitation value and that, when the primary power exceeds the limitation value, outputs an adjustment command to adjust an operating frequency of the DC motor such that the primary power becomes equal to or less than the limitation value,
      an operating-frequency control unit that adjusts the operating frequency on a basis of the adjustment command and that outputs a generation command to generate a signal corresponding to the operating frequency, and
      a waveform generation unit that generates a drive signal corresponding to the generation command and that outputs the drive signal to the inverter unit.

7. The inverter control device according to claim 6, wherein
   the storage unit stores therein synchronization-loss limit-magnet-temperature data, magnetic-force temperature-characteristics data, and synchronization-loss limit-power data as the information regarding the synchronization-loss limit, and
   the synchronization-loss limit-power calculation unit
      calculates a magnet-temperature difference on a basis of the magnet temperature and the synchronization-loss limit-magnet-temperature data,
      calculates a rate of change in magnetic force on a basis of the magnet-temperature difference and the magnetic-force temperature-characteristics data, and
      calculates the limitation value on a basis of the rate of change in magnetic force and the synchronization-loss limit-current data.

8. The inverter control device according to claim 6, wherein
   the storage unit stores therein synchronization-loss limit-bus-voltage data and synchronization-loss limit-power data as the information regarding the synchronization-loss limit, and
   the synchronization-loss limit-power calculation unit
      calculates a bus voltage ratio on a basis of the bus voltage and the synchronization-loss limit-bus-voltage data, and
      calculates the limitation value on a basis of the bus voltage ratio and the synchronization-loss limit-power data.

9. The inverter control device according to claim 6, wherein the magnet-temperature detection unit calculates a magnet temperature by converting a temperature detected indirectly from a magnet to a magnet temperature.

10. An air conditioner comprising the inverter control device according to claim 6.

11. An inverter control device that controls an inverter unit that converts a DC voltage from a converter unit to an AC voltage and supplies the AC voltage to a DC motor, where the converter unit converts a voltage from a commercial AC power supply to a DC voltage, the inverter control device comprising:
   a short-circuit control unit that is incorporated in the converter unit and that controls a DC voltage to be applied from the converter unit to the inverter unit by a diode bridge driven by switching of a short-circuit element;
   a magnet-temperature detection unit that detects a magnet temperature of the DC motor;
   a bus-voltage detection unit that detects, as a first bus voltage, a DC voltage to be applied to the inverter unit;
   a primary-current detection unit that detects a primary current to be input to the converter unit;
   a primary-voltage detection unit that detects a primary voltage to be applied to the converter unit; and
   a control unit that controls the inverter unit, wherein
   the control unit includes
      a storage unit that stores therein information regarding a synchronization-loss limit,
      a primary-power calculation unit that calculates primary power on a basis of the primary current and the primary voltage,
      a bus-voltage calculation unit that calculates a second bus voltage required to drive the DC motor on a basis of the primary power and the information regarding the synchronization-loss limit,
      a bus-voltage control unit that compares the first bus voltage with the second bus voltage and that, when the first bus voltage is equal to or lower than the second bus voltage, outputs a generation command to generate a drive signal such that the first bus voltage becomes equal to or higher than the second bus voltage, and, when the first bus voltage exceeds the second bus voltage, outputs a generation command to generate a drive signal such that the first bus voltage becomes equal to or lower than the second bus voltage, and
      a drive-signal generation unit that generates a drive signal corresponding to the generation command and that outputs the drive signal to the short-circuit control unit.

12. The inverter control device according to claim 11, wherein
   the storage unit stores therein synchronization-loss limit-magnet-temperature data, magnetic-force temperature-characteristics data, and synchronization-loss limit-bus-voltage data as the information regarding the synchronization-loss limit, and
   the bus-voltage calculation unit
      calculates a magnet-temperature difference on a basis of the magnet temperature and the synchronization-loss limit-magnet-temperature data, calculates an inverse of a rate of change in magnetic force on a basis of the magnet-temperature difference and the magnetic-force temperature-characteristics data, and calculates the second bus voltage on a basis of the inverse of the rate of change in magnetic force and the synchronization-loss limit-bus-voltage data.

13. The inverter control device according to claim 11, wherein the storage unit stores therein synchronization-loss limit-power data and synchronization-loss limit-bus-voltage data as the information regarding the synchronization-loss limit, and the synchronization-loss limit-power calculation unit calculates a power ratio on a basis of the primary power and the synchronization-loss limit-power data, and calculates the second bus voltage on a basis of the power ratio and the synchronization-loss limit-bus-voltage data.

14. The inverter control device according to claim 11, wherein the magnet-temperature detection unit calculates a magnet temperature by converting a temperature detected indirectly from a magnet to a magnet temperature.

15. An air conditioner comprising the inverter control device according to claim 11.

* * * * *